United States Patent
Torrey et al.

(10) Patent No.: US 11,598,327 B2
(45) Date of Patent: Mar. 7, 2023

(54) COMPRESSOR SYSTEM WITH HEAT RECOVERY

(71) Applicant: General Electric Company, Schenectady, NY (US)

(72) Inventors: David Allan Torrey, Ballston Spa, NY (US); Douglas C. Hofer, Niskayuna, NY (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 16/674,614

(22) Filed: Nov. 5, 2019

(65) Prior Publication Data
US 2021/0131429 A1    May 6, 2021

(51) Int. Cl.
*F04B 41/06*    (2006.01)
*F04B 35/04*    (2006.01)

(52) U.S. Cl.
CPC .............. *F04B 41/06* (2013.01); *F04B 35/04* (2013.01)

(58) Field of Classification Search
CPC ........ F04B 35/002; F04B 35/04; F04B 41/06; F04B 41/00; F04D 25/16; F04D 25/04; F04D 25/06; F04D 25/00; F04C 23/00; F04C 23/001; F04C 23/02; F04C 29/005; F04C 29/0085; F04C 2210/222; F01K 23/10; F01K 25/103; F01K 7/32; F02C 1/10; F02C 6/18; F02C 1/06
See application file for complete search history.

(56) References Cited

U.S. PATENT DOCUMENTS

| | | | |
|---|---|---|---|
| 4,321,790 A * | 3/1982 | Vadas | F01K 23/103 60/39.182 |
| 7,950,214 B2 | 5/2011 | Bronicki et al. | |
| 9,115,605 B2 * | 8/2015 | Held | F01K 25/103 |
| 9,341,084 B2 | 5/2016 | Xie et al. | |
| 9,410,451 B2 | 8/2016 | Laing et al. | |
| 9,677,432 B2 | 6/2017 | Kang et al. | |

(Continued)

FOREIGN PATENT DOCUMENTS

| | | |
|---|---|---|
| CN | 109322743 A | 2/2019 |
| WO | 2004074641 A1 | 9/2004 |
| WO | 2005024188 A2 | 3/2005 |

OTHER PUBLICATIONS

English translation of WO2004074641, machine translation from WIPO website, generated Dec. 1, 2021. (Year: 2021).*

(Continued)

*Primary Examiner* — Bryan M Lettman
(74) *Attorney, Agent, or Firm* — Fletcher Yoder, P.C.

(57) ABSTRACT

A system includes a first working fluid compressor configured to pressurize a working fluid, and a prime mover coupled to the first working fluid compressor and configured to provide a mechanical input into the first working fluid compressor. An exhaust assembly is coupled to the prime mover and is configured to receive exhaust heat from the prime mover, the exhaust assembly including a generator configured to generate electric current based on the exhaust heat received by the exhaust assembly. A second working fluid compressor includes an electric motor electrically and synchronously coupled to the generator and configured to pressurize the working fluid.

20 Claims, 5 Drawing Sheets

(56) References Cited

U.S. PATENT DOCUMENTS

| | | | |
|---|---|---|---|
| 10,309,262 B2 | 6/2019 | Bak et al. | |
| 2007/0199606 A1* | 8/2007 | Bronicki | F04D 25/00 |
| | | | 138/39 |
| 2007/0256424 A1 | 11/2007 | Briesch et al. | |
| 2008/0022682 A1* | 1/2008 | Tafas | F01K 23/10 |
| | | | 60/618 |
| 2009/0301054 A1 | 12/2009 | Simpson et al. | |
| 2010/0018244 A1* | 1/2010 | Watanabe | F04B 35/04 |
| | | | 62/244 |
| 2011/0278846 A1* | 11/2011 | Landi | F02C 6/18 |
| | | | 290/52 |
| 2013/0055711 A1* | 3/2013 | Hofer | F02D 41/045 |
| | | | 60/602 |
| 2013/0152576 A1 | 6/2013 | Mavuri et al. | |
| 2013/0292951 A1* | 11/2013 | Eckert | F01K 15/02 |
| | | | 290/1 A |
| 2014/0102101 A1* | 4/2014 | Xie | F01K 25/103 |
| | | | 60/647 |
| 2015/0354383 A1* | 12/2015 | Kalra | F01D 11/04 |
| | | | 415/177 |
| 2018/0313232 A1 | 11/2018 | Auciello et al. | |

OTHER PUBLICATIONS

European Search Report for corresponding EP Application No. 20194199.4, dated Feb. 19, 2021.

Conboy et al., "Performance Characteristics of an Operating Supercritical CO2 Brayton Cycle", ASME Turbo Expo 2012: Turbine Technical Conference and Exposition, vol. 5, pp. 941-952, Jun. 11-15, 2012.

Kim et al., "Supercritical CO2 Rankine Cycles for Waste Heat Recovery From Gas Turbine", Energy, vol. 118, pp. 893-905, Jan. 1, 2017.

\* cited by examiner

COMPRESSOR SYSTEM WITH HEAT RECOVERY

GOVERNMENT LICENSE RIGHTS

This invention was made with government support under contract number DE-FE000031617 awarded by the Department of Energy. The government has certain rights in the invention.

FIELD

The subject matter described herein relates to a compressor system.

BACKGROUND

A compressor operates to increase pressure of a working fluid. In particular, a prime mover is used to rotate a shaft, and/or blades to pressurize a working fluid through the compressor. The prime mover may be a reciprocating engine, such as a piston based engine, a combustion turbine, etc. The prime mover provides the work that pressurizes the working fluid. Additionally, heat is exhausted from the prime mover. This exhaust heat may then be reused as part of a thermodynamic cycle, such as in the Brayton cycle.

In some applications, attempting to use the heat in the exhaust gases can be problematic. For example, when natural gas is conveyed through pipelines across long distances, several compressors may need to be spaced apart along the pipelines to pressurize or maintain pressure of the natural gas. Facilities that include such compressors are referred to as compressor stations. These compressor stations typically house the compressor and prime mover. With the excess heat being exhausted, however, the size of the equipment needed to use the excess heat can be large and expensive. Specifically, the gain in electricity and/or efficiency may not offset the cost and design constraints resulting from use of the exhaust heat. Electricity generated by such a turbine may not have a place to he transmitted or stored, however, because compressor stations often are remote from electrical grids. Thus, the cost and size constraints make providing such a turbine undesirable.

While smaller, more compact turbines exist that may be able to more effectively handle exhaust heat, often the working fluid of such turbines is considered harmful to the environment. With environmental concerns ever present for natural gas pipelines, again, such turbines are also undesirable. As a result, exhaust heat from compressor stations is simply exhausted into the atmosphere, causing significant inefficiencies within compressor stations.

BRIEF DESCRIPTION

In one or more embodiments, a system is provided that includes a first working fluid compressor configured to pressurize a working fluid, and a prime mover coupled to the first working fluid compressor and configured to provide a mechanical input into the first working fluid compressor. An exhaust assembly is coupled to the prime mover and configured to receive exhaust heat from the prime mover. The exhaust assembly includes a generator configured to generate electric current based on the exhaust heat received by the exhaust assembly. A second working fluid compressor is also provided that includes an electric motor electrically and synchronously coupled to the generator and configured to pressurize the working fluid.

In one or more embodiments, a method is provided that includes pressurizing a first working fluid with a first working fluid compressor, supplying a mechanical input with a prime mover to the first working fluid compressor, and conveying exhaust heat expelled by the prime mover when supplying the mechanical input to the first working fluid compressor to an exhaust assembly. The exhaust heat is converted into an electric current with the exhaust assembly. The electric current is then synchronously supplied from the exhaust assembly to an electric motor. The electric motor supplies a mechanical input to a second working fluid compressor for pressurizing the first working fluid with the second working fluid compressor.

In one or more embodiments, a system is provided that includes a pipeline configured to convey natural gas, and a first compressor assembly fluidly coupled to the pipeline and configured to receive and pressurize the natural gas and expel exhaust heat. An exhaust assembly is fluidly coupled to the first compressor assembly and configured to receive the exhaust heat expelled by the first compressor assembly. The exhaust assembly includes at least one compressor configured to operate with a super critical working fluid. The exhaust assembly also includes a generator that receives a mechanical input from an auxiliary turbine that is mechanically coupled to the at least one compressor configured to operate with the super critical working fluid. The generator is configured to generate electric current at a predetermined frequency. A second compressor assembly is provided that includes an electric motor electrically coupled to the generator of the exhaust assembly. The second compressor assembly is also configured to receive the natural gas to pressurize the natural gas.

BRIEF DESCRIPTION OF THE DRAWINGS

The present inventive subject matter will be better understood from reading the following description of non-limiting embodiments, with reference to the attached drawings, wherein below.

DETAILED DESCRIPTION

A compressor system is provided that includes a first compressor driven by a reciprocating engine or a combustion turbine coupled to an exhaust assembly containing a heat driven power cycle. The heat driven power cycle in the exhaust assembly provides a variable driving force to an electric motor to control the operation of a second compressor coupled to the electric motor to supplement pressurization of working fluid through the compressor system. The heat driven power cycle in the exhaust assembly is sealed to prevent leakage of operating fluids into the environment. Specifically, the exhaust assembly utilizes the exhaust heat from the first compressor as an energy source to power a generator that is electrically coupled to an electrical motor that operates a second, or supplemental compressor.

A synchronous electrical coupling is provided between the generator and electrical motor allowing a high frequency input that drives the electrical motor. Also, by having the synchronous electrical coupling at a high frequency, the exhaust assembly may be hermetically sealed within a container or housing to prevent leakage of operating fuel of the exhaust assembly. In this manner, the exhaust assembly may utilize a turbine, such as a super critical CO2 turbine, to convert the exhaust heat into electric current without concern of leakage of CO2 emissions into the environment. Additionally, the exhaust assembly also functions to modulate the load on the electric motor to provide a variable input. In this manner, the exhaust assembly may operate, or control the electric motor of the second compressor.

Figure 1:
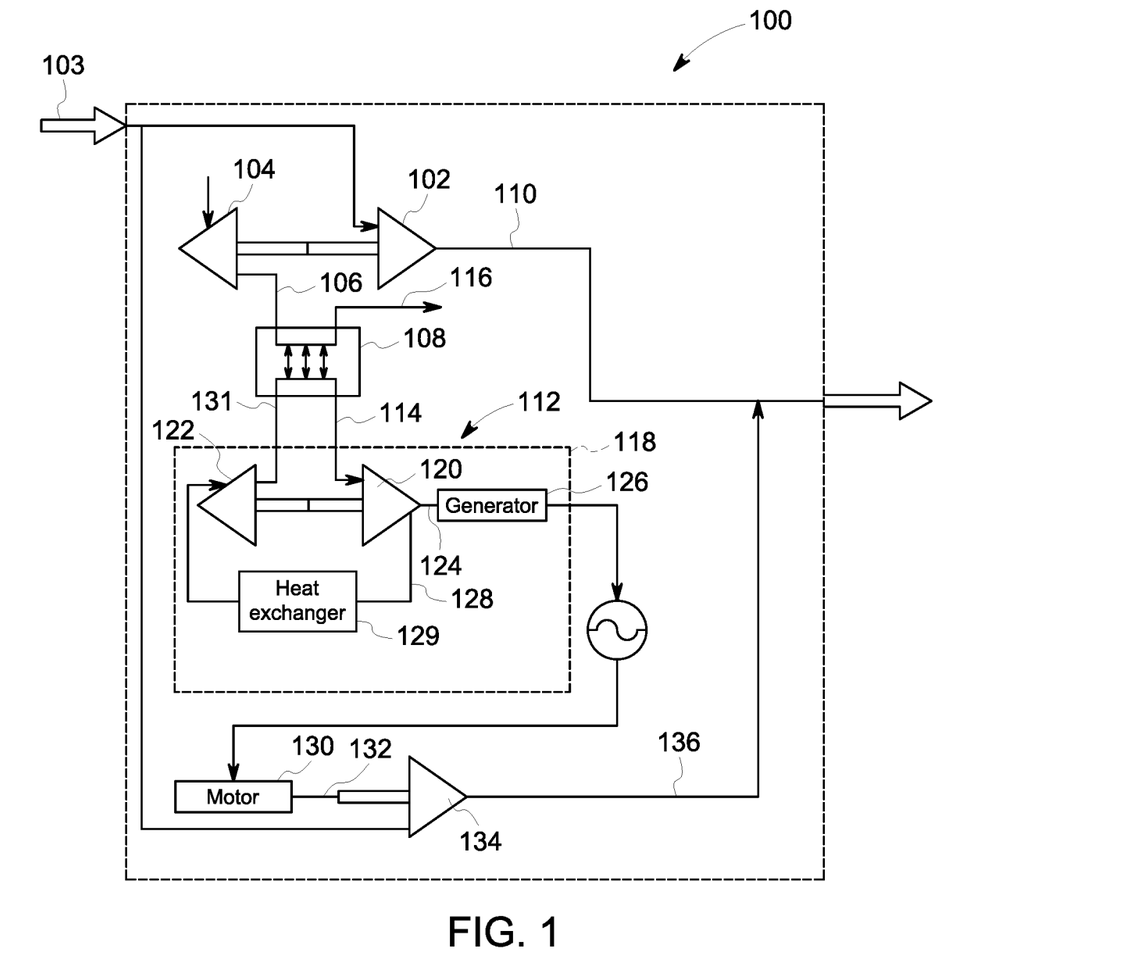
FIG. 1 is a schematic diagram of a compressor system in accordance with one embodiment.

FIG. 1 illustrates a schematic diagram of a compressor system 100. The compressor system 100 in one example may be a compressor station that pressurizes natural gas flowing through a natural gas pipeline. Alternatively, the compressor system may pressurize another working fluid as the fluid is conveyed from a first location to a second location.

The compressor system 100 includes a first working fluid compressor 102 that receives a working fluid from an inlet 103. In one example, the working fluid is natural gas, though in alternative examples other working fluids may be provided. The first working fluid compressor 102 is coupled to a prime mover 104. In one example, the prime mover 104 is a turbine, such as a gas turbine. In other examples the prime mover 104 may be mechanically operated through a combustion process to operate the first compressor 102. After the combustion drives the prime mover 104, heat from the combustion exits the prime mover along an exhaust path 106 to a heat exchanger 108. As used herein, heat exchanger 108 may be considered a device that transfers heat between two fluid wherein the two fluids are physically separated from one another within the heat exchanger. The fluids may be gases, liquids, or a gas and a liquid. In one example, the exhaust heat is expelled at approximately 1000° F. Meanwhile, the prime mover 104 provides the work needed for the first working fluid compressor 102 to pressurize the working fluid. In particular, the working fluid is received from the inlet 103 and flows into the first compressor 102 and exits the compressor 102 along a first outlet fluid flow path 110 with a pressurized boost.

An exhaust assembly 112 is coupled to the prime mover 104 such that the heat within the exhaust path 106 is received by the exhaust assembly 112 via the heat exchanger 108. In particular, the heat exchanger 108 receives heat from the prime mover 104 and conveys the heat to an inlet 114 of the exhaust assembly 112. The heat exchanger 108 also expels low temperature exhaust gas from an outlet 116. The exhaust assembly 112 in one example is a waste heat recovery assembly.

The exhaust assembly 112 may be sealed within a housing 118 such that working components are not exposed to the environment. The exhaust assembly 112 may be hermetically sealed within the housing 118. In one example, the exhaust assembly 112 includes the heat exchanger 108 within the housing 118 that receives the exhaust heat generated by the prime mover 104. Alternatively, the heat exchanger 108 is located remote to the housing 118 and provides only the inlet 114 into the housing 118.

The exhaust assembly 112 includes an auxiliary turbine 120 that is mechanically coupled to an auxiliary compressor 122. The auxiliary turbine 120 may also be considered an expander, or a turbine expander. In one embodiment, the auxiliary turbine 120 and auxiliary compressor 122 are a supercritical CO2 turbine and a supercritical CO2 compressor. Supercritical CO2 (sCO2) is a fluid state of carbon dioxide held above the critical temperature and critical pressure of the carbon dioxide. A critical point of a substance is the endpoint of an equilibrium curve between phases. For supercritical CO2 the critical point is the pressure point and temperature point between gas and liquid where an increase in pressure forms liquid, even with a corresponding increase in temperature. For CO2, the critical temperature is approximately 31.10° C. or 87.98° F., and the critical pressure is approximately 73.9 bar, or 1071 pounds per square inch.

By using supercritical CO2, the auxiliary turbine 120 and auxiliary compressor 122 may be reduced in size. By reducing the size of the auxiliary turbine 120 and auxiliary compressor 122, the entire exhaust assembly 112 may be sealed within the housing 118 such that if the auxiliary turbine 120 or auxiliary compressor 122 leak, the housing 118 can contain the leak, preventing any effect on the environment.

The auxiliary turbine 120 receives a heated second working fluid from the heat exchanger 108. The second working fluid may be considered an auxiliary working fluid. In one example, the second working fluid is a super critical working fluid such as super critical CO2. The auxiliary turbine then converts the energy in the second working fluid into mechanical work, rotating an input shaft 124 that may function as an input shaft of a generator 126. Meanwhile, the exhaust second working fluid from the auxiliary turbine 120 flows from an outlet 128 to a heat exchanger 129 that transfers excess heat into the environment. In one example cooling water flows through the heat exchanger 129 and heat is transferred to the cooling water that exits the heat exchanger 129. The heated water may then be used for other purposes. Alternatively, cooling air may be used to transfer heat from the auxiliary turbine 120 and exhaust the heat. From the heat exchanger 129, the second working fluid flows through path 131 to an inlet of the auxiliary compressor 122 where the second working fluid may be compressed and conveyed into the heat exchanger 108 where heat is transferred to the second working fluid for use by the auxiliary turbine 120. In this manner effectively, a closed loop Brayton cycle may be presented within the exhaust assembly 112.

In one example, the input shaft 124 functions as a rotor of the generator 126. Alternatively, the input shaft 124 can be mechanically coupled to the rotor of the generator 126 to rotate the rotor at a determined frequency. Specifically, a gear set may be used in association with the input shaft 124 to provide a determined input frequency for a rotor mechanically coupled to the input shaft 124. As a result, the frequency of the electric current generated by the generator 126 may be mechanically controlled, eliminating or reducing the need for using electronic conditioning circuitry. Electronic conditioning circuitry may be circuitry that receives current at a first frequency and modifies the frequency of the current to a second different frequency. In particular, the current may be conditioned to change the frequency of the current. This is opposed to electronic circuitry that may be used to merely provide an electrical connection and does not modify the frequency of the current. In the compressor system 100, the need for electronic conditioning circuitry can be eliminated or reduced, because inputs of the exhaust assembly 112 may be modified to control the input frequency of the rotor of the generator. Thus, whether through thermodynamic properties, gearing properties, or the like, the frequency of the electric current generated by the generator 126 can be varied and controlled through mechanical systems instead of electrical systems. As a result, the electrical circuitry associated with the generator 126 may be simplified.

The generator 126 receives the input from the input shaft 124. In one example, the input shaft 124 rotates at 15000 rpm, or 250 Hz. Specifically, the generator 126 may be a high frequency generator, where the auxiliary turbine 120 controls the output speed of the input shaft 124, and thus may vary the frequency of the generator 126 based on the heat conveyed to the auxiliary turbine 120. As used herein, a high frequency generator, or high frequency current source references to frequencies above 60 Hz. Any component of the exhaust assembly may be monitored and operated to control the output speed of the input shaft 124, and thus the input frequency to the generator 126. In this manner, the exhaust assembly 112 may function to provide a variable frequency input based on thermodynamic parameters, or mechanical parameters of the components within the exhaust assembly 112.

Figure 4:
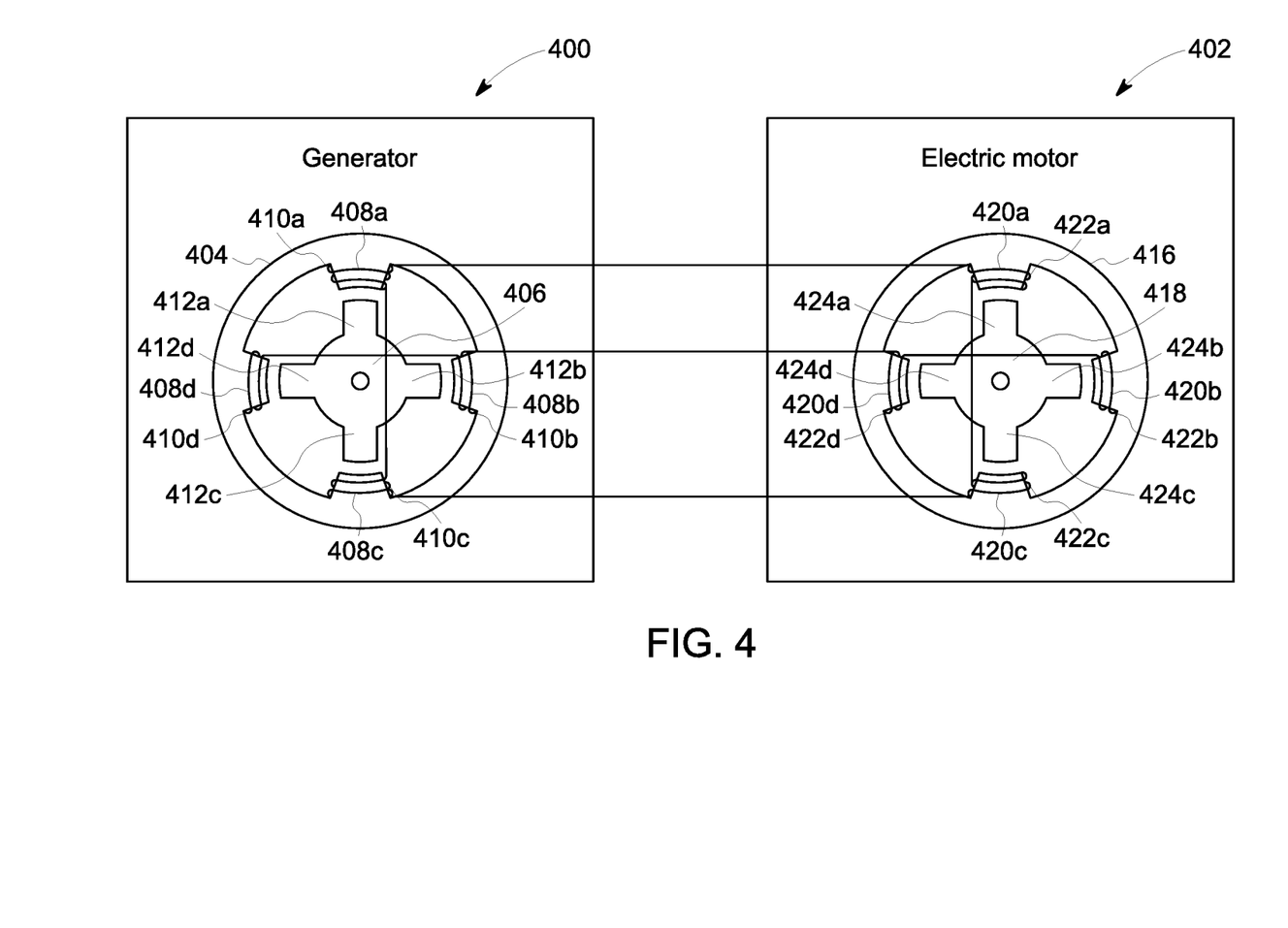
FIG. 4 is a schematic view of a generator and electric motor in accordance with one embodiment.
Figure 5:
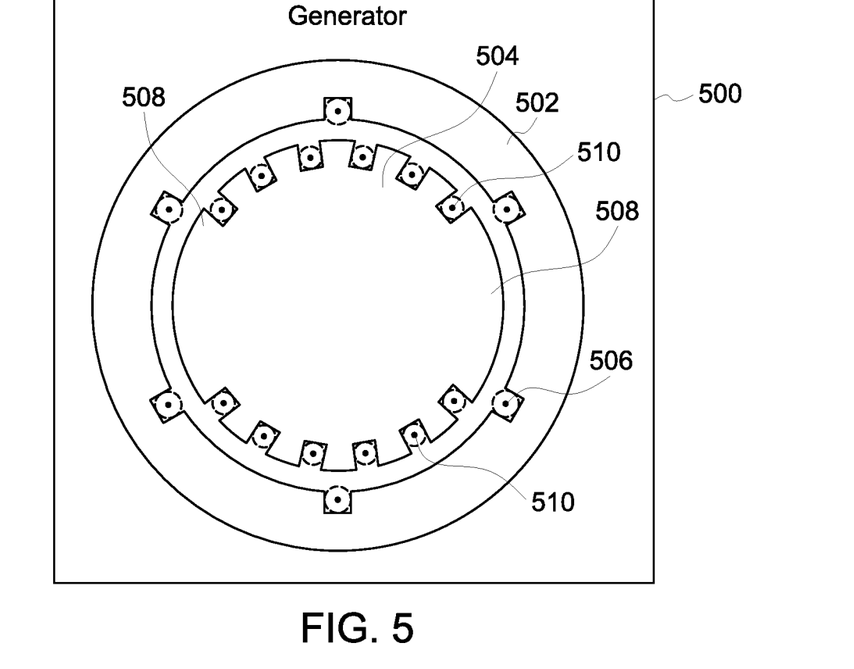
FIG. 5 is a schematic view of a generator and electric motor in accordance with one embodiment.
Figure 6:
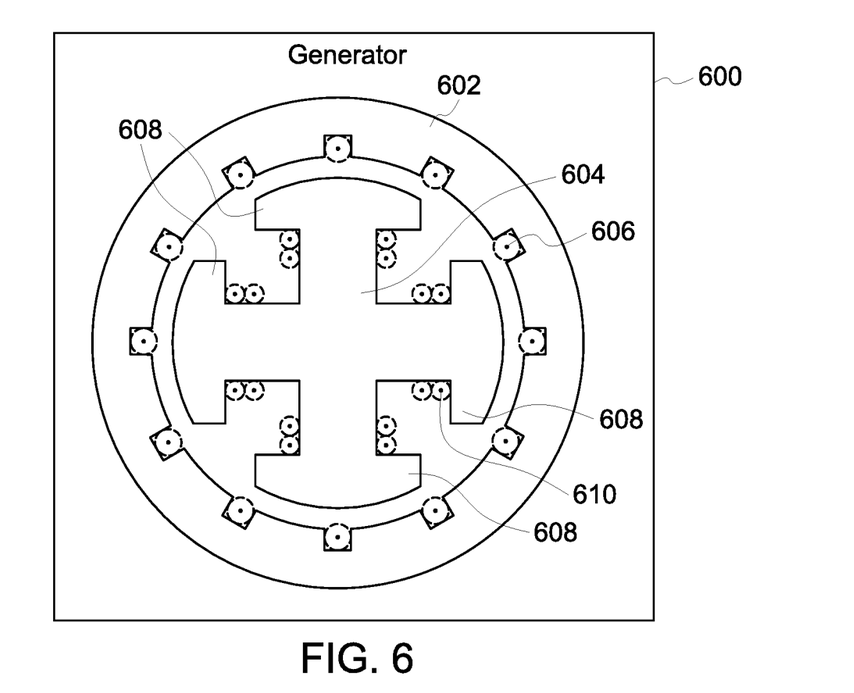
FIG. 6 is a schematic view of a generator and electric motor in accordance with one embodiment.

The generator 126 may be an electric dipole generator that includes two or more dipoles, and a winding that comprises a number of loops rotating in the magnetic field between the dipoles. The number of magnetic poles may vary. The generator 126 includes a rotor and stator, and may include any of the rotor and stator arrangements as depicted in FIGS. 4-6. In one example, two magnetic poles may be used, whereas in another example, six or more magnetic poles may be used. The rotating of the winding within the magnetic field then induces electromotive force (EMF) to produce current. The rotational speed of the input shaft 124 consequently controls the current, and specifically the frequency of the current produced by the generator. In particular, as the rotational speed of the input shaft 124 increases, the frequency of the current generated by the generator 126 similarly can increase.

The generator 126 may be electrically coupled to an electric motor 130. In one example, the electric motor 130 may be an alternating current (A/C) motor that includes a number of magnetic poles similar to the generator. The generator 126 and electric motor 130 may be synchronously coupled and electrically coupled to accommodate a high frequency output of the generator 126. In particular, a synchronous coupling may be provided because the electric motor 130 outputs a frequency that may be the same as the frequency inputted into the generator, or the frequency inputted into the generator may be only altered by a ratio of the number of magnetic poles in the generator 126 compared to the number of magnetic poles in the electric motor 130. By being synchronous, additional electronic conditioning circuitry for adjusting the output frequency of the current from the exhaust system may be unneeded.

The electric motor 130 receives the current from the generator 126 at the magnetic poles to rotate an output shaft 132 to provide work. The output shaft 132 may be the rotor of the electric motor 130, or may be mechanically coupled to the rotor. Similar to the input shaft 124 of the auxiliary turbine 120, while the output shaft 132 may be the rotor, in other embodiments, the output frequency of the output shaft 132 may be modified through mechanical gearing to provide a desired output frequency of the electric motor 130. Again, this allows adjustment of the output frequency without use of electronic conditioning circuitry, simplifying the electrical connection between the generator 126 and electric motor 130.

In one example, the number of magnetic poles of the rotor of the electric motor 130 may be the same as the number of poles of the rotor of the generator 126, such as two magnetic poles to two magnetic poles. In such an embodiment, the poles present a one-to-one ratio. Alternatively, in another example, the rotor of the generator 126 may have six magnetic poles while the rotor of the electric motor may have 4 magnetic poles to provide a ratio of 1.5. In this manner, an electric gear set may be provided for the rotor, or output shaft 132, of the generator 126. The electric gear set reduces or increases the input to the generator 126 based on the magnetic pole ratio of the rotor of the generator 126 compared to the rotor of the electric motor 130. In each example, the generator 126 operates synchronously with the electric motor 130 to reduce the need to use power electronics, or electronic conditioning circuitry to convert frequencies. By reducing the use of power electronics, the system may be more reliable, and cost effective.

The output shaft 132 of the electric motor 130 can be mechanically coupled to a second working fluid compressor 134. The output shaft 132 may be controlled by the current input from the generator 126 along with the ratio of poles between the generator 126 and electric motor 130. Therefore, the output shaft 132 may be rotated and provide work at a revolutions per second desired by the second working fluid compressor 134. By using the input shaft 124 of the auxiliary turbine 120 to create current in the generator 126, instead of as a prime mover for the second working fluid compressor 134, the exhaust assembly 112 may be sealed within the housing 118 and prevent leakage of the second working fluid in the exhaust assembly 112 from reaching the environment. Specifically, a rotating input shaft 124 would need an opening within a housing to rotate, providing an area for second working fluid, such as CO2, to escape. Whereas, with the input shaft 124 being used with a generator 126 to produce current, the electric coupling allows for a sealable coupling through the housing 118 to the electric motor 130. Additionally, by using magnetic pole ratios between the generator 126 and electric motor 130, the output shaft 132 speed may be varied and controlled as needed for the second working fluid compressor 134. Consequently, the exhaust generated from operating the prime mover 104 may be used to supplement the pressurization of the first working fluid by powering the electric motor 130 to operate a second working fluid compressor 134. The resulting system may be over 10% more efficient than systems that do not recycle the exhaust heat. Additionally, the exhaust assembly 112 can be sealed to the environment to prevent environmental leaks, thus preventing drawback from implementation of the system.

The second working fluid compressor 134 receives the first working fluid from the inlet 103. The first working fluid may be compressed, and pressurized within the second working fluid compressor. The pressurized first working fluid may then be expelled from the second working fluid compressor 134 into a second outlet fluid flow path 136. The second outlet fluid flow path 136 may combine with and intersect the first fluid flow path 110 to combine pressurized first working fluid before exiting the compressor system 100. While in the example of FIG. 1, the first working fluid compressor 102 and second working fluid compressor 134 are illustrated in a parallel arrangement, in other examples, the first working fluid compressor 102 and second working fluid compressor 134 may be in a series arrangement.

Figure 2:
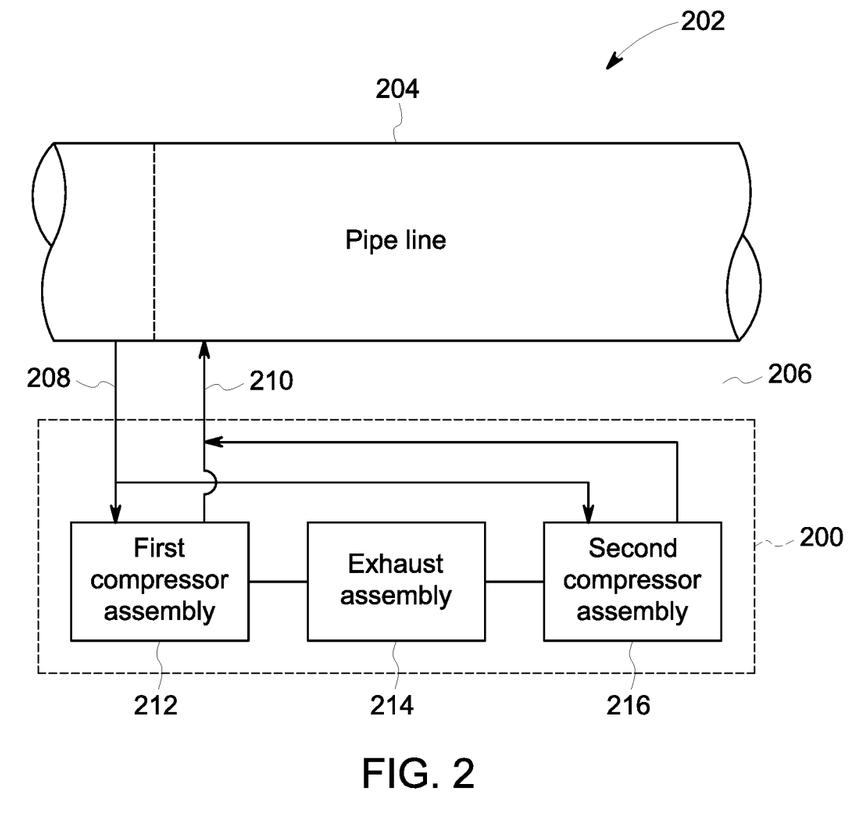
FIG. 2 is a schematic diagram of a compressor system in accordance with one embodiment.

FIG. 2 illustrates a schematic diagram of an example compressor system 200 used within a predetermined environment 202. The compressor system 200 in one example may be a compressor station. The compressor system 200 in one example may be the compressor system 100 of FIG. 1. Specifically, within the environment 202 can be a pipeline 204 that extends across a terrain 206. In one example, the pipeline 204 may be a natural gas pipeline. The compressor system 200 can be coupled within the pipeline 204 to receive a first working fluid at an inlet 208 and to provide pressurized working fluid at an outlet 210. In particular, all of the first working fluid within the pipeline 204 is conveyed to the compressor system 200 for pressurization before returning to the pipeline 204. As illustrated, the compressor system 200 includes a first compressor assembly 212, an exhaust assembly 214, and a second compressor assembly 216 for pressurizing the first working fluid. Alternatively, additional compressor assemblies may be provided in the compressor system 200 and work in parallel with the first compressor assembly 212 and second compressor assembly 216. The first compressor assembly 212 may include a prime mover, engine, motor, turbine, gas turbine, or the like, to provide an input to a first compressor to pressurize the first working fluid.

The exhaust assembly 214 may include a heat exchanger, compressor, engine, motor, turbine, gas turbine, generator, etc. to convert heat from the first compressor assembly into a high frequency current source. In one example, the exhaust assembly 214 converts the exhaust heat of the first compressor assembly as described in relation to FIG. 1. Alternatively, the exhaust heat may be converted in an alternative manner. In one example, the exhaust assembly 214 may be hermetically sealed within a housing to prevent the leakage of a second working fluid used by the exhaust assembly into the pipeline 204 or environment.

The second compressor assembly 216 may include an electric motor that can be electrically coupled to the exhaust assembly 214. In one example, the electric motor can be synchronously coupled with a generator of the exhaust assembly 214. In all, the second compressor assembly receives an input from the exhaust assembly and pressurizes the first working fluid received at the inlet 208 for providing pressurized working fluid at the output 210.

Figure 3:
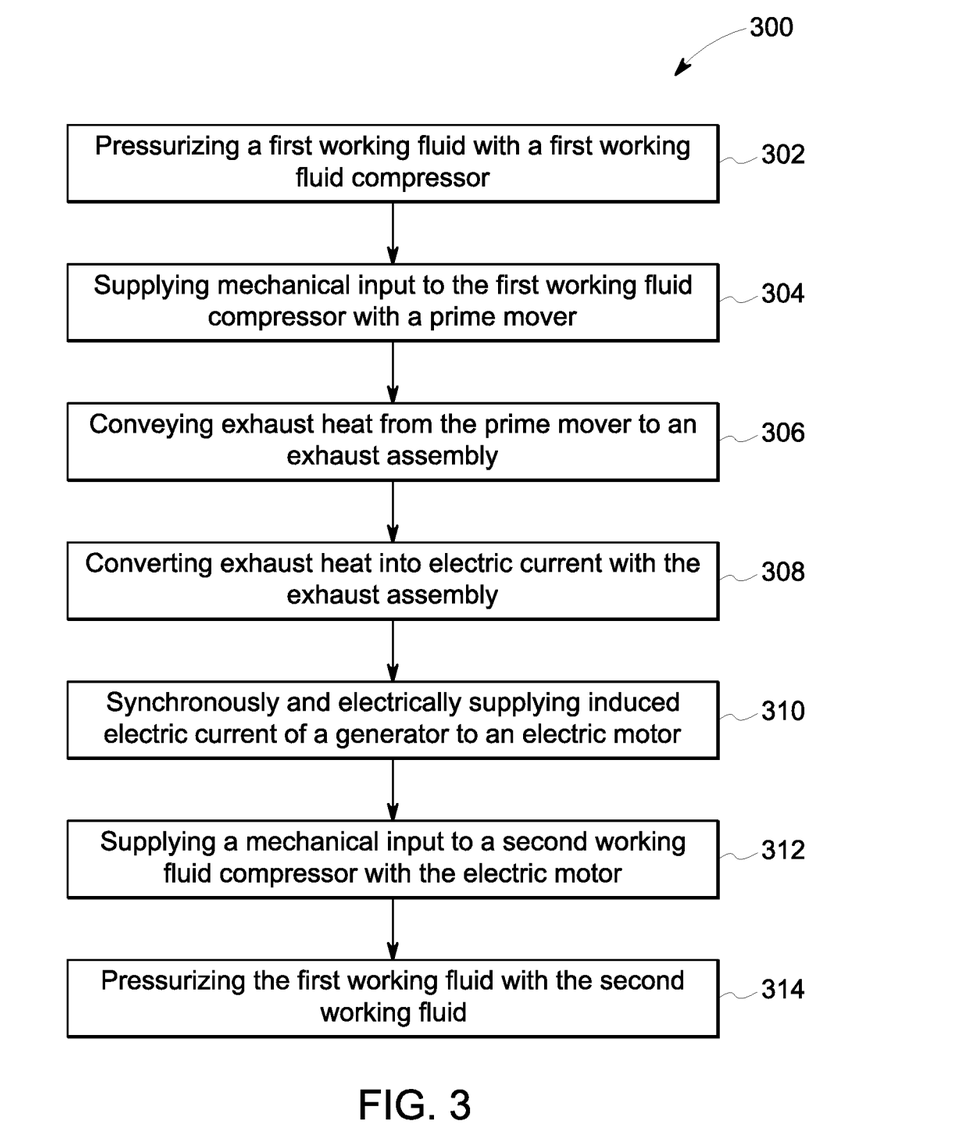
FIG. 3 is a flow block diagram of a process of supplementing pressurization of a working fluid in accordance with one embodiment.

FIG. 3 illustrates a schematic block process diagram of an example process 300 of supplementing pressurization of a first working fluid. The example process 300 may be implemented by the compressor systems 100 or 200. In one example, the first working fluid may be natural gas supplied through a pipeline spanning across a terrain.

At 302, a first working fluid can be pressurized with a first working fluid compressor. The first working fluid compressor may include an input that receives the first working fluid and an output that expels the first working fluid as pressurized fluid.

At 304, a mechanical input can be supplied to the first working fluid compressor with a prime mover. The prime mover may be an internal combustion engine, gas turbine, hybrid engine, or the like that includes an output shaft that may be used by the first working fluid compressor. The prime mover operates simultaneously with the first working fluid compressor to provide the mechanical input needed to pressurize the first working fluid.

At 306, exhaust heat can be expelled by the prime mover when supplying the mechanical input to the first working fluid compressor and conveyed to an exhaust assembly. The exhaust heat may be generated as a byproduct of the engine rotating an output shaft. The exhaust heat may be generated by burning fuel, expanding fuel, heating fuel, etc. In one example, the exhaust heat may be over 1000° F.

At 308, exhaust heat can be converted into electric current with the exhaust assembly. In one example, the exhaust assembly includes a heat exchanger that receives the exhaust heat and conveys input heat from the heat exchanger to an auxiliary turbine. The auxiliary turbine extracts work from a second working fluid and exhausts to a heat rejection heat exchanger which extracts residual heat from the second working fluid and transfers it to the environment. In one example, the second working fluid is a super critical working fluid. The super critical working fluid may be super critical $CO_2$. The auxiliary compressor may then compress the second working fluid from the heat rejection heat exchanger and returns the working fluid to the exhaust heat exchanger to complete the cycle. The auxiliary turbine provides the mechanical input to drive the auxiliary compressor.

The auxiliary turbine may expand the input heat from the heat exchanger to generate a turbine mechanical output. The turbine mechanical output in one example may supply power to a rotor of the generator. In particular, the rotor may include a predetermined number of magnetic poles, each of which is supported by a winding or a permanent magnet. The generator additionally includes a stator that also has a predetermined number of magnetic poles each having a winding. The stator and rotor will have the same number of poles. The rotating magnet poles produce a continuously changing magnetic field in relation to the stator magnetic poles to generate voltage in the stator windings. In this manner the generator generates an AC voltage based on the turbine mechanical output. The frequency of the AC voltage is tied to the speed of the turbine shaft.

At 310, the electric voltage induced within the stator of the generator can be synchronously and electrically supplied from the generator of the exhaust assembly to an electric motor. Specifically, the turbine provides a turbine mechanical output that may be received by the generator as described above in relation to FIG. 1. In one example, the turbine mechanical output can be mechanically coupled to the rotor of the generator. In another example, the turbine mechanical output can be a rotating shaft that may be the rotor of the generator. The rotor thus includes a rotating shaft that rotates at a first rotational speed, or first frequency.

The rotor includes magnetic poles with windings that are rotated accordingly to induce an electric current in the stator of the generator at a first frequency. The electric voltage induced within the stator of the generator may then be received by the winding of a stator of the electric motor. The current in the winding around the magnetic poles of the stator form a magnetic field that may interact with the magnetic field created by the rotor field windings of the electric motor. The rotor field of the motor can also be created by permanent magnets. Consequently, the rotor of the electric motor may rotate based on the electric voltage received from the generator and the number of magnetic poles of the rotor of the generator and motor.

Based on the arrangement, the first frequency of the rotor of the generator may be a multiple of the ratio of the number of magnetic poles of the rotor of the generator compared to the number of magnetic poles of the rotor of the electric motor. Specifically, by connecting the generator to the electric motor, a synchronous coupling may be provided where output frequency of the electric motor may be controlled by the ratio of the magnetic poles of the generator and electric motor. In this manner, the electric motor may be configured to receive a high frequency input to ensure additional electronic conditioning circuity may not be required, or may be reduced to provide current of a determined frequency to the electric motor.

By providing a high frequency electric motor that avoids use of electronic conditioning circuitry, the only coupling between the generator and electric motor may be a simple conductive coupling. By providing a simple conductive coupling without additional electronic conditioning circuitry, the entire exhaust assembly may be sealed within a housing with the conductive coupling disposed through the housing to provide the coupling to the electric motor. By sealing the exhaust assembly within a housing, any leakage of the second working fluid of the exhaust assembly may be contained in the housing and not emitted to the environment.

At 312, the electric motor supplies a mechanical input to a second working fluid compressor. In one example, the mechanical input may be a rotating output shaft of the electric motor.

At 314, the second working fluid compressor pressurizes the first working fluid. Specifically, by utilizing the exhaust assembly to generate electric current that operates the electric motor, a second working fluid compressor may be added to the compressor system to supplement pressurization of the first working fluid.

FIG. 4 illustrates a schematic example of a generator 400 electrically and synchronously coupled to an electric motor 402. The generator 400 includes a generator stator 404 that can be stationary and a generator rotor 406 that rotates within the generator stator 404. While in this example the generator rotor 406 rotates within the generator stator 404, in other examples the generator stator 404 may be within the generator rotor 406 that rotates about the generator stator 404. The generator stator 404 includes a first magnetic pole 408a, second magnetic pole 408b, third magnetic pole 408c, and fourth magnetic pole 408d, wherein the first magnetic pole 408a includes a first winding 410a, the second magnetic pole 408b includes a second winding 410b, the third magnetic pole 408c includes a third winding 410c, and the fourth magnetic pole 408d includes a fourth winding 410d. The generator rotor 406 similarly includes a first magnetic pole 412a, second magnetic pole 412b, third magnetic pole 412c, and fourth magnetic pole 412d. In one example, the first magnetic pole 412a, second magnetic pole 412b, third magnetic pole 412c, and fourth magnetic pole 412d are permanent magnets that establish the magnetic field of the generator rotor 406. Alternatively, the generator rotor 406 may include field windings that establish the magnetic field.

The electric motor 402 similarly includes an electric motor stator 416 and an electric motor rotor 418. The electric motor stator 416 includes a first magnetic pole 420a, second magnetic pole 420b, third magnetic pole 420c, and fourth magnetic pole 420d with corresponding first windings 422a, second windings 422b, third windings 422c, and fourth windings 422d. Specifically, the windings 422a, 422b, 422c, and 422d of the electric motor stator 416 are electrically coupled to the windings 410a, 410b, 410c, and 410d of the generator stator 404 to receive the induced current from the generator stator 404. The electric motor rotor 418 also includes a first magnetic pole 424a, second magnetic pole 424b, third magnetic pole 424c, and fourth magnetic pole 424d. Based on the current within the windings 422a, 422b, 422c, and 422d of the electric motor stator 416, the magnetic field produced results in the magnetic poles 424a, 424b, 424c, and 424d rotating the electric motor rotor 418 accordingly. In one example the first magnetic pole 424a, second magnetic pole 424b, third magnetic pole 424c, and fourth magnetic pole 424d of the electric motor rotor 418 may be permanent magnets to establish a magnetic field. Alternatively, the first magnetic pole 424a, second magnetic pole 424b, third magnetic pole 424c, and fourth magnetic pole 424d of the electric motor rotor 418 may include windings to establish a magnetic field.

In the embodiment of FIG. 4, the magnetic pole ratio of the generator rotor 406 compared to the electric motor rotor 418 is one to one. Specifically, the number of poles of the generator rotor 406 and generator stator 404 must be equal, and similarly the number of poles of the electric motor stator 416 and electric motor rotor 418 must also be equal. Thus, because the generator stator 404 and generator rotor 406 each have four poles, the generator is considered a four pole generator. Similarly, because the electric motor 402 also has an electric motor stator 416 with four poles and corresponding electric motor rotor 418 with four poles, the electric motor 402 is considered a four pole electric motor.

While in FIG. 4 the electric generator 400 and electric motor 402 are a four pole electric generator and four pole electric motor having poles at a four to four, or one to one ratio, in other examples, the electric generator 400 may have a different number of poles than the electric motor 402. In one example, the electric generator 400 may be a six pole electric generator while the electric motor 402 is a four pole electric motor. A six magnetic pole to four magnetic pole ratio between the generator 400 and electric motor 402 results in a generator output frequency that is three times the rotational frequency of the generator 400 while the rotational speed of the electric motor 402 is one half the frequency applied to the stator. Consequently, the motor rotor 418 rotates at a speed that is one and a half times higher than the rotational speed of the generator rotor 406. In yet other examples, the electric generator 400 may be a two pole electric generator while the electric motor 402 may be a four pole electric motor. In yet another example, the electric generator 400 may be a four pole electric generator while the electric motor 402 is a six pole electric motor. In each example, the number of poles of the electric generator 400 compared to the electric motor 402 may be used to vary the relationship between the input frequency of the electric generator rotor 406 compared to the output frequency of the electric motor rotor 418 based on the ratio of the number of poles of the electric generator 400 compared to the electric motor 402. This ratio may be one to one, two to one, one and a half to one, half to one, an integer value, a non-integer value, etc.

Thus, the input frequency of a mechanical input into the generator can be the output frequency of a mechanical output from the electric motor 402, or a ratio thereof. In this manner, the generator 400 and electric motor 402 are both electrically and synchronously coupled such that additional electronic conditioning circuitry to adjust the frequency of the output frequency of the mechanical output from the electric motor 402 may be reduced, or unneeded. Because the electric generator 400 and electric motor 402 are synchronously coupled, the output frequency of a mechanical output of the electric motor 402 is dependent on an input frequency of a mechanical input of a generator 400 without the use of additional electronic conditioning circuitry to condition the output frequency of the mechanical output of the electric motor 402.

FIG. 5 illustrates an example electric generator 500. In one embodiment, the electric generator 500, is the electric generator 126 of FIG. 1. While described as an electric generator 500, the electric generator 500 may similarly be utilized as an electric motor. In one example, the electric generator 500 illustrated in FIG. 5 is utilized as the electric motor 130 of FIG. 1. To this end, the example electric generator 500 of FIG. 5 may be utilized as both the electric generator 126 of FIG. 1, and the electric motor 130 of FIG. 1 in an arrangement where the ratio between the electric generator and electric motor is one to one.

The electric generator 500 illustrated is a two pole machine. The electric generator includes a stator 502 and rotor 504. The stator may include stator windings 506 while the rotor 504 includes rotor poles 508 with rotor windings 510. Alternatively, the rotor poles 508 may be permanent magnets. In one example, the rotor may be considered to be a smooth rotor. In the example of FIG. 5, the electrical frequency of the stator 502 is the same as the rotational frequency of the rotor 504. Thus, when used as a generator, the electrical frequency produced at the stator winding is the same as the mechanical frequency of the input shaft. When used as an electric motor the output shaft speed of the electric motor is equal to the electrical frequency received from a corresponding generator. In this manner, the two pole machine may be used to vary the frequency of the input shaft of a generator to provide the frequency of the output shaft of an electric motor. Thus, the two pole machine of FIG. 5 represents a machine that may be used to provide a synchronous coupling between an electric generator and electric motor.

FIG. 6 illustrates another example electric generator 600. In one embodiment, the electric generator 600, is the electric generator 126 of FIG. 1. While described as an electric generator 600, the electric generator 600 may similarly be utilized as an electric motor. In one example, the electric generator 600 illustrated in FIG. 6 is utilized as the electric motor 130 of FIG. 1. To this end, the example electric generator 600 of FIG. 6 may be utilized as both the electric generator 126 of FIG. 1 and the electric motor 130 of FIG. 1 in an arrangement where the ratio between the electric generator and electric motor is one to one.

The electric generator 600 illustrated is a four pole machine. The electric generator includes a stator 602 and rotor 604. The stator may include stator windings 606 while the rotor 604 includes rotor poles 608 with rotor windings 610. Alternatively, the rotor poles 608 may be permanent magnets. In one example, the rotor may be considered to be a salient pole rotor. In the example of FIG. 6, the electrical frequency of the stator 602 is twice the rotational frequency of the rotor 604. In general, the stator electrical frequency is Np/2 times the rotor rotational frequency, where Np is the number of poles. When the electric generator 600 of FIG. 6 is utilized as an electric motor, the output shaft of the motor spins at one-half the of the electrical frequency supplied by the generator. When the electric generator 600 is utilized as an electric generator, the electrical frequency produced at the stator winding 606 is twice the mechanical frequency of the input shaft of the generator. Thus, the four pole machine of FIG. 6 represents another machine that may be used to provide a synchronous coupling between an electric generator and electric motor. In all, the examples of FIGS. 4-6 illustrate some embodiments and electric generators and/or electric motors that may be used to provide the synchronous connection. In other examples, other electric generators and/or electric motors may be utilized that include more poles, different materials, etc. to provide the synchronous coupling.

In one or more embodiments, a system may be provided that may include a first working fluid compressor configured to pressurize a first working fluid, and a prime mover coupled to the first working fluid compressor and configured to provide a mechanical input into the first working fluid compressor. The system may also include an exhaust assembly coupled to the prime mover and configured to receive exhaust heat from the prime mover, the exhaust assembly including a generator configured to generate electric current based on the exhaust heat received by the exhaust assembly, and a second working fluid compressor including an electric motor electrically and synchronously coupled to the generator and configured to pressurize the first working fluid.

Optionally, the generator includes a rotor with plural magnetic poles, and the electric motor includes a rotor with plural magnetic poles. In one example, a ratio of the plural magnetic poles of the rotor of the generator compared to the plural magnetic poles of the rotor of the electric motor may be one to one. Alternatively, a ratio of the plural magnetic poles of the rotor of the generator compared to the plural magnetic poles of the rotor of the electric motor may be a non-integer.

Optionally, the exhaust assembly may be sealed within a housing configured to prevent fluid leakage of a second working fluid. In another aspect, the generator may be electrically coupled to the electric motor through the housing.

Optionally, electronic conditioning circuitry used to vary frequency may not be provided to electrically couple the electric motor and the generator.

Optionally, the exhaust assembly may include a heat exchanger configured to receive the exhaust heat from the first working fluid compressor and generate input heat. The exhaust assembly may also include an auxiliary turbine coupled to the heat exchanger and configured to receive the input heat from the heat exchanger and convert the input heat into mechanical energy to rotate an input shaft that may be electrically coupled within the generator.

Optionally, the exhaust assembly may include an auxiliary compressor that may be fluidly coupled to the auxiliary turbine and the heat exchanger, the auxiliary compressor configured to receive an second working fluid from the auxiliary turbine, transfer heat from the second working fluid, and pressurize the second working fluid.

Optionally, the auxiliary compressor may be a super critical carbon dioxide compressor.

Optionally, the first working fluid may be natural gas.

In one or more embodiment a method may be provided that can include pressurizing a first working fluid with a first working fluid compressor, supplying a mechanical input with a prime mover to the first working fluid compressor, and conveying exhaust heat expelled by the prime mover when supplying the mechanical input to the first working fluid compressor to an exhaust assembly. The method also includes converting the exhaust heat into an electric current with the exhaust assembly, and synchronously supplying the electric current from the exhaust assembly to an electric motor. The method also includes supplying a mechanical input with the electric motor to a second working fluid compressor, and pressurizing the first working fluid with the second working fluid compressor.

Optionally, converting the exhaust heat into the electric current may include receiving the exhaust heat at a heat exchanger, and conveying input heat from the heat exchanger to an auxiliary turbine. Converting the exhaust heat into the electric current may also include expanding the input heat from the heat exchanger with the auxiliary turbine to generate a turbine mechanical output, and generating the electric current with a generator that receives the turbine mechanical output.

Optionally, converting the exhaust heat into the electric current may also include compressing a second working fluid with a super critical compressor to provide a super critical compressor input to the auxiliary turbine. The super critical compressor output from the auxiliary turbine may also be conveyed to a heat exchanger to reject heat from the second working fluid before being conveyed to the super critical compressor.

Optionally, the synchronously supplying the electric current from the exhaust assembly to the electric motor may include receiving a turbine mechanical output at a rotor of a generator, the rotor of the generator rotating at a first frequency, generating the electrical current with plural magnetic poles of the rotor of the generator, and supplying the electrical current generated to the electric motor to rotate plural magnetic poles of a rotor of the electric motor.

Optionally, a ratio of the plural magnetic poles of the rotor of the generator compared to the plural magnetic poles of the rotor of the electric motor may be one to one.

Optionally, the method may also include sealing the exhaust assembly within a housing.

In one or more embodiments, a system may be provided that can include a pipeline configured to convey natural gas, a first compressor assembly fluidly coupled to the pipeline and configured to receive and pressurize the natural gas and expel exhaust heat, and an exhaust assembly fluidly coupled to the first compressor assembly and configured to receive the exhaust heat expelled by the first compressor assembly, the exhaust assembly including at least one compressor configured to operate with a super critical working fluid. The exhaust assembly may include a generator that receives a mechanical input from an auxiliary turbine that may be mechanically coupled to the at least one compressor configured to operate with the super critical working fluid. Exhaust super critical working fluid from the auxiliary turbine is conveyed to a heat exchanger to exhaust heat into the environment. The at least one compressor operating with the super critical working fluid then receives the super critical working fluid from the heat exchanger to compress the super critical working fluid before conveying through the heat exchanger that receives heat from the first compressor assembly. The generator may be configured to generate electric current at a predetermined frequency. The exhaust assembly may also include a second compressor assembly including an electric motor electrically coupled to the generator of the exhaust assembly, and configured to receive the natural gas to pressurize the natural gas.

Optionally, the electric motor may provide a mechanical output at the predetermined frequency.

Optionally, the exhaust assembly may be sealingly disposed with a housing.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a first working fluid compressor configured to pressurize a first working fluid;
    a prime mover coupled to the first working fluid compressor and configured to provide a mechanical input into the first working fluid compressor;
    an exhaust assembly coupled to the prime mover and configured to receive exhaust heat from the prime mover, wherein the exhaust assembly comprises:
        a first heat exchanger configured to receive the exhaust heat from the prime mover and transfer input heat into a second working fluid configured to flow along a flow path, wherein the second working fluid comprises a super critical working fluid;
        an auxiliary turbine disposed along the flow path downstream from the first heat exchanger wherein the auxiliary turbine is driven by the second working fluid;
        a second heat exchanger disposed along the flow path downstream from the auxiliary turbine, wherein the second heat exchanger is configured to cool the second working fluid;
        an auxiliary compressor disposed along the flow path downstream from the second heat exchanger and upstream from the first heat exchanger. wherein the auxiliary compressor is configured to pressurize the second working fluid;
        a generator coupled to the auxiliary turbine, wherein the generator is configured to generate an electric current; and
    a housing, wherein the exhaust assembly has at least the auxiliary turbine, the auxiliary compressor, and the generator disposed inside of the housing; and a second working fluid compressor an electric motor electrically and synchronously coupled to the generator and configured to pressurize the first working fluid, wherein the second working fluid compressor and the electric motor are disposed outside of the housing, and an electrical connection extends through the housing between the generator and the electric motor.

2. The system of claim 1, wherein the super critical working fluid comprises a super critical carbon dioxide.

3. The system of claim 1, wherein the generator includes a rotor with a plurality of magnetic poles, and wherein the electric motor includes a rotor with a plurality of magnetic poles, wherein a ratio of the plurality of magnetic poles of the rotor of the generator compared to the plurality of magnetic poles of the rotor of the electric motor is one to one.

4. The system of claim 1, wherein the generator includes a rotor with a plurality of magnetic poles, and wherein the electric motor includes a rotor with a plurality of magnetic poles, wherein a ratio of the plurality of magnetic poles of the rotor of the generator compared to the plurality of magnetic poles of the rotor of the electric motor is a non-integer.

5. The system of claim 1, wherein at least the auxiliary turbine, the auxiliary compressor, and the generator are sealed within the housing configured to prevent fluid leakage of the second working fluid.

6. The system of claim 1, wherein the first and second working fluid compressors are arranged in parallel to compress the first working fluid in parallel.

7. The system of claim 1, wherein electronic conditioning circuitry used to vary a frequency of the electric current is not provided to electrically couple the electric motor and the generator.

8. The system of claim 1, wherein the second heat exchanger is disposed inside of the housing.

9. The system of claim 8, wherein the first heat exchanger is disposed inside of the housing.

10. The system of claim 8, wherein the first heat exchanger is disposed outside of the housing.

11. The system of claim 1, wherein the first working fluid is natural gas.

12. A method comprising:
pressurizing a first working fluid with a first working fluid compressor;
supplying a mechanical input with a prime mover to the first working fluid compressor;
conveying exhaust heat expelled by the prime mover when supplying the mechanical input to the first working fluid compressor to an exhaust assembly;
converting the exhaust heat into an electric current with a generator of the exhaust assembly, comprising:
receiving the exhaust heat at a first heat exchanger and transferring input heat into a second working fluid configured to flow along a flow path, wherein the second working fluid comprises a super critical working fluid;
driving an auxiliary turbine along the flow path downstream from the first heat exchanger via the second working fluid;
cooling the second working fluid in a second heat exchanger disposed along the flow path downstream from the auxiliary turbine;
pressurizing the second working fluid in an auxiliary compressor disposed along the flow path downstream from the second heat exchanger and upstream from the first heat exchanger; and
driving the generator with the auxiliary turbine to generate the electric current, wherein the exhaust assembly has at least the auxiliary turbine, the auxiliary compressor, and the generator disposed inside of a housing;
synchronously supplying the electric current from the generator to an electric motor, wherein the electric motor is disposed outside of the housing, and an electrical connection extends through the housing between the generator and the electric motor;
supplying a mechanical input with the electric motor to a second working fluid compressor, wherein the second working fluid compressor is disposed outside of the housing; and
pressurizing the first working fluid with the second working fluid compressor.

13. The method of claim 12, wherein the first heat exchanger is disposed outside of the housing. and the second heat exchanger is disposed inside of the housing.

14. The method of claim 12, wherein the first and second heat exchangers are disposed inside of the housing.

15. The method of claim 12, wherein the synchronously supplying the electric current from the generator to the electric motor comprises:
receiving a turbine mechanical output at a rotor of the generator, the rotor of the generator rotating at a first frequency;
generating the electrical current with a plurality of magnetic poles of the rotor of the generator;
supplying the electrical current to the electric motor to rotate a plurality of magnetic poles of a rotor of the electric motor.

16. The method of claim 15, wherein a ratio of the plurality of magnetic poles of the rotor of the generator compared to the plurality of magnetic poles of the rotor of the electric motor is one to one.

17. The method of claim 12, further comprising sealing the exhaust assembly including the generator, the auxiliary turbine, and the auxiliary compressor inside the housing, wherein the second working fluid comprises a super critical carbon dioxide.

18. A system comprising:
a first compressor assembly configured to receive and pressurize a natural gas and expel an exhaust heat;
an exhaust assembly fluidly coupled to the first compressor assembly and. configured to receive the exhaust heat expelled by the first compressor assembly, wherein the exhaust assembly comprises;
a housing,
an auxiliary turbine disposed inside of the housing,
at least one compressor disposed inside of the housing, and
a generator disposed inside of the housing, wherein the auxiliary turbine is configured to be driven by a super critical working fluid that is heated by the exhaust heat, wherein the generator is configured to be driven by the auxiliary turbine to generate electric current at a predetermined frequency, wherein the at least one compressor is configured to be driven by the auxiliary turbine to compress the super critical working fluid; and
a second compressor assembly including an electric motor electrically coupled to the generator of the exhaust assembly, wherein the second compressor assembly is configured to receive the natural gas to pressurize the natural gas, wherein the second compressor assembly including the electric motor is disposed outside of the housing, wherein an electrical connection extends through the housing between the generator and the electric motor.

19. The system of claim 18, wherein the electric motor provides a mechanical output at the predetermined frequency, wherein the first and second compressor assemblies are arranged in parallel to compress the natural gas in parallel.

20. The system of claim 18, wherein the exhaust assembly is sealingly disposed inside of the housing, wherein the super critical working fluid comprises a super critical carbon dioxide.

* * * * *